United States Patent
Singh

(10) Patent No.: US 6,256,021 B1
(45) Date of Patent: Jul. 3, 2001

(54) APPARATUS AND METHOD OF CONFIGURING TARGET AREAS WITHIN A TOUCHABLE ITEM OF A TOUCHSCREEN

(75) Inventor: Mona Singh, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/153,769

(22) Filed: Sep. 15, 1998

(51) Int. Cl.[7] .............................. G09G 5/00; G09G 5/08
(52) U.S. Cl. ............................... 345/173; 345/178
(58) Field of Search ...................... 345/178, 173

(56) References Cited

U.S. PATENT DOCUMENTS 5,801,941 9/1998 Bertram .
5,818,451 * 10/1998 Bertram et al. ...................... 345/354

FOREIGN PATENT DOCUMENTS 0 618 528 A1 10/1994 (EP) .

OTHER PUBLICATIONS

R. D. Riecken, "Adaptive Direct Manipulation" published in Systems, Man, and Cybernetics, Decision Aiding for Complex Systems Conference Proceedings, IEEE International Conference 1991, pp. 1115–1120 vol. 2.*

* cited by examiner

Primary Examiner—Steven Saras
Assistant Examiner—William C. Spencer
(74) Attorney, Agent, or Firm—Davidson & Gribbell, LLP

(57) ABSTRACT

An apparatus and method of configuring a target area within a touchable item provided on a touchscreen, the target area for a touchable item being defined in accordance with an angle of approach employed by a user of the touchscreen to select the touchable item and a display location for the touchable item within the touchscreen. Configuration of the target area includes modeling a shape for the target area, determining a center point for the target area within the touchable item, and determining an orientation for the target area within the touchable item.

41 Claims, 7 Drawing Sheets

APPARATUS AND METHOD OF CONFIGURING TARGET AREAS WITHIN A TOUCHABLE ITEM OF A TOUCHSCREEN

BACKGROUND OF THE INVENTION

1. Field of the Invention

The present invention relates generally to the selection of touchable items on a computer-controlled touchscreen display and, more particularly, to an apparatus and method of configuring a target area within such touchable items which takes into account the angle of approach by the user for selection.

2. Description of Related Art

Various types of computer-based devices have been developed for communications, information processing and other purposes. Among these devices are personal computers, personal digital assistants, and a relatively new class of devices known as portable intelligent communications devices. Unlike the first two devices, the portable intelligent communications device is designed extensively to be a communications device, rather than just a mobile computer, and as such it includes a computer integrated with communication hardware and software to provide telephony, messaging and information services. To enable at least some of these features, the portable intelligent communications device is able to be connected to the Internet by either a wired link or a wireless link.

It will also be understood that certain software applications are provided within the portable intelligent communications device which facilitate the aforementioned features, as well as other desirable features such as a Personal Information Manager (PIM), games and the like. An exemplary portable intelligent communications device is shown and disclosed in a patent application entitled "Switching Of Analog Signals In Mobile Computing Devices" and having Ser. No. 08/796,119, which is owned by the assignee of the present invention and is hereby incorporated by reference.

As noted in another related patent application entitled "Apparatus And Method Of Formatting A List For Display On A Touchscreen," having Ser. No. 09/083,012 and also being owned by the assignee of the present invention, the portable intelligent communications device preferably employs a touchscreen in conjunction therewith. It will be understood that a number of touchable items are displayed on the touchscreen which activate certain functions associated therewith when touched by a user. By "touchable item," it is meant any icon, symbol, designation, or other representation, either graphic and/or text in nature, which causes a related action or function to take place when touched (e.g., a graphical user interface).

It will further be appreciated that each touchable item is configured so as to have a defined area therefor. This target area typically does not encompass the total area displayed for a touchable item, but has a predetermined shape and dimension. It is only when this predefined target area is touched by a user that the function or action associated with the touchable item is actually activated. Since a pattern of interaction with a touchscreen has been found to vary depending upon the angle of approach taken by the user, a proportionate number of errors has been found to occur when the touchscreen, and particularly the target areas for touchable items, is not configured for the angle of approach taken by the user. More specifically, the angle of approach taken by a user is most directly related to which hand is employed to touch the touchscreen (i.e., from the right edge of the touchscreen for right-handed users and from the left edge of the touchscreen for left-handed users).

Accordingly, it is a primary object of the present invention to provide an apparatus and method of configuring a target area within a touchable item displayed on a touchscreen which improves the touch accuracy of both right-handed and left-handed users.

It is another object of the present invention to provide an apparatus and method of configuring a target area within a touchable item displayed on a touchscreen which maximizes the overlap area between such target area and an anticipated touch for the associated touchable item.

It is still another object of the present invention to provide an apparatus and method of configuring a target area within a touchable item displayed on a touchscreen which customizes the location and orientation of the target area depending upon the angle of approach taken by a user thereof.

Yet another object of the present invention is to provide an apparatus and method in a portable intelligent communications device of configuring a target area within a touchable item displayed on a touchscreen which permits flexibility for multiple users of the device.

Another object of the present invention is to provide an apparatus and method in a portable intelligent communications device of configuring a target area within a touchable item displayed on a touchscreen which takes into account the display location of the touchable item on the touchscreen.

These objects and other features of the present invention will become more readily apparent upon reference to the following description when taken in conjunction with the following drawings.

SUMMARY OF THE INVENTION

In accordance with a first aspect of the present invention, a method of configuring a target area within a touchable item displayed on a touchscreen of a computer system is disclosed as including the steps of determining an angle of approach employed by a user of the computer touchscreen to select the touchable item, determining a display location for the touchable item on the touchscreen, and defining the target area for the touchable item in accordance with the determinations of the previous steps, whereby an overlap area between the target area and an anticipated actual touch by the user is maximized.

In accordance with a second aspect of the present invention, a target area for activating each touchable item displayed on a touchscreen of a computer system having a memory circuit, a processing circuit, and a touchscreen is disclosed. The method includes the steps of determining which hand is to be employed by a user of the computer system to select the touchable items, determining a display location of each touchable item on the touchscreen, modeling a shape for the target area of each touchable item, positioning a center point for the target area of each touchable item according to the determinations of the previous steps, and orienting the target area of each touchable item according to the determinations of the previous steps.

In accordance with a third aspect of the present invention, a portable intelligent communications device is disclosed as including circuitry for performing telephony operations, a memory circuit for storing a plurality of touchable items representative of certain functions of the portable intelligent communications device, a touchscreen for displaying the touchable items, each touchable item including a target area associated therewith, and a processing circuit for configuring the target area of each touchable item according to the display location of the touchable item on the touchscreen and which hand is employed by a user of the portable intelligent communication device, whereby an overlap area between the target area and an anticipated actual touch by the user is maximized.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
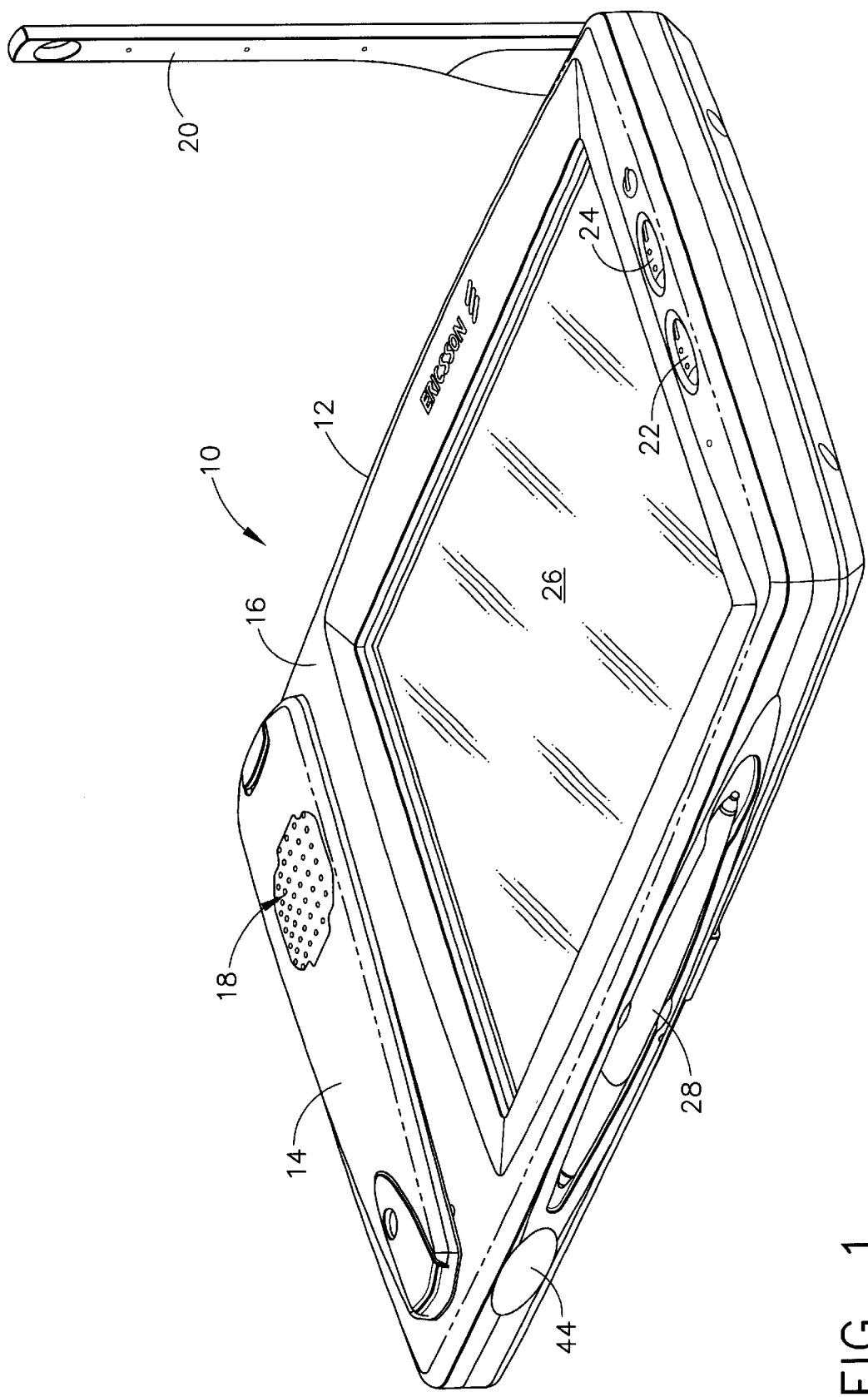
FIG. 1 is a perspective view of a portable intelligent communications device having a touchscreen in accordance with the present invention.

Referring now to the drawings in detail, wherein identical numerals indicate the same elements throughout the figures, FIG. 1 depicts a portable intelligent communications device identified generally by the numeral 10. It will be understood that portable intelligent communications device 10 is principally a communications device, and includes circuitry and components which allow it to function in such capacity through cellular, landline, infrared data association (IrDA), phone cards, and other modes. Portable intelligent communications device 10 also includes circuitry which enables it to function in the capacity of a computer and a plurality of software applications may be utilized therewith. Because of this combination, portable intelligent communications device 10 is uniquely suited to interface software applications with the communications hardware and software, particularly where connection to an Internet address is desired. In this regard, it will be understood that portable intelligent communications device 10 generally operates in accordance with a device shown and described in a patent application entitled "Switching Of Analog Signals in Mobile Computing Devices" and having Ser. No. 08/796,119, which is also owned by the assignee of the present invention and is hereby incorporated by reference.

As seen in FIG. 1, portable intelligent communications device 10 includes a casing 12 for housing the communications and other circuitry as will be discussed in greater detail hereinafter. A handset 14 is positioned within a top portion 16 of casing 12 and preferably includes a built-in speaker 18 for use when handset 14 is maintained therein. A pivotable antenna 20 (shown in FIG. 1 in the open or use position) is provided to enable a communications function, as when portable intelligent communications device 10 is in a cellular mode of operation. It will be understood that various ports, jacks, and interfaces will be provided to further enable communications functions by portable intelligent communications device 10. Control buttons 22 and 24 are also shown as being located on top portion 16 of casing 12.

Portable intelligent communications device 10 further includes a display screen 26, which preferably is a touchscreen. It will be appreciated that a stylus 28 may optionally be utilized to indicate a particular area more specifically than can be accomplished with the user's finger, although most designated areas, defined herein as target areas, are sized for touch interaction by a typically sized finger. Since portable intelligent communications device 10 preferably is no larger than a standard business desk telephone, display screen 26 is sized to be approximately eight (8) inches measured diagonally across. This puts touchscreen 26 in a distinct size class, as it is smaller than normal monitor sizes for personal and portable computers and larger than screen displays for personal digital assistants (PDAs), calculators, and other similar personal electronic devices.

Figure 2:
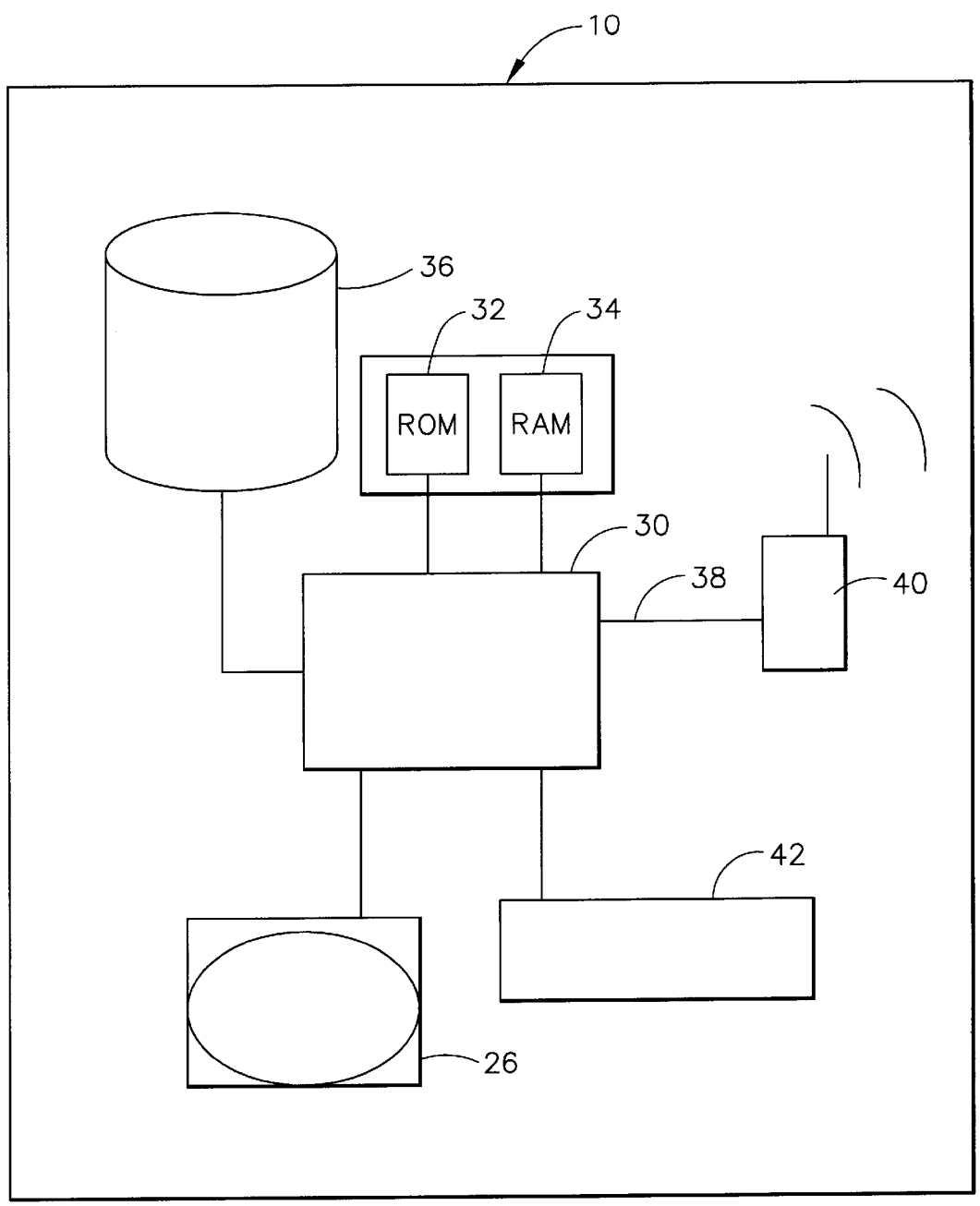
FIG. 2 is a block diagram of the major components of the portable intelligent communications device depicted in FIG. 1.

Turning to FIG. 2, the internal circuitry of portable intelligent communications device 10 includes a processing circuit 30, which may, for example, be a Motorola microprocessor known by the designation Power PC 821. It will be seen that processing circuit 30 is connected to both Read Only Memory (ROM 32) and Random Access Memory (RAM) 34, which store both operating systems and software applications. An optional bulk storage device 36 is further provided for storing databases. Processing circuit 30 is also coupled to display screen 26 through a standard driver (not shown) in order to control the images displayed thereon, as well as receive information through graphical user interfaces in which the user of portable intelligent communications device 10 may indicate chosen options. The communications functions of portable intelligent communications device 10 are also handled through processing circuit 30 via a serial and/or parallel port 38 to the particular circuitry of a communications mode designated generically by reference numeral 40. As noted hereinabove, there are several communication mode options available, including cellular, landline, IrDA, and phone cards, and it will be appreciated that more than one such option may be utilized at a given time. A keyboard 42 may also be connected to processing circuit 30, where keyboard 42 can be depicted on display screen 26 or be a separate physical package which can be utilized with portable intelligent communications device 10 such as through a keyboard IR port 44 (see FIG. 1).

Figure 3:
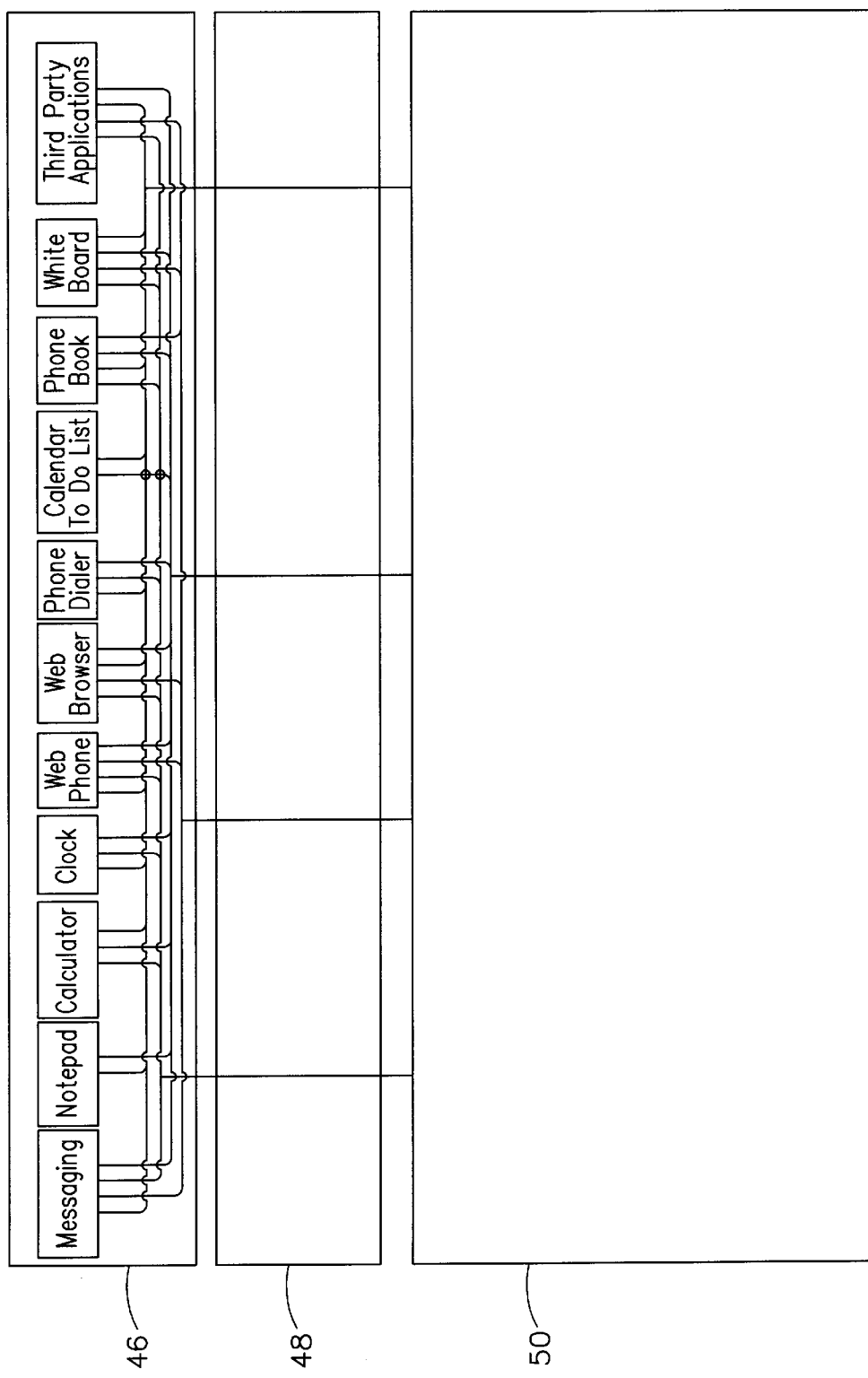
FIG. 3 is a block diagram of the software architecture for the portable intelligent communications device depicted in FIGS. 1 and 2.

FIG. 3 depicts a schematic block diagram of the software architecture for portable intelligent communications device 10. As seen therein, the software is divided into three basic areas: applications software 46, desktop software 48, and system operating software 50 (which includes everything else from the class libraries down to the device drivers for portable intelligent communications device 10). It will be understood that neither applications software 46 nor desktop software 48 will ever interact with anything other than the top layer of system operating software 50. Exemplary software applications are shown within applications software 46.

Figure 4:
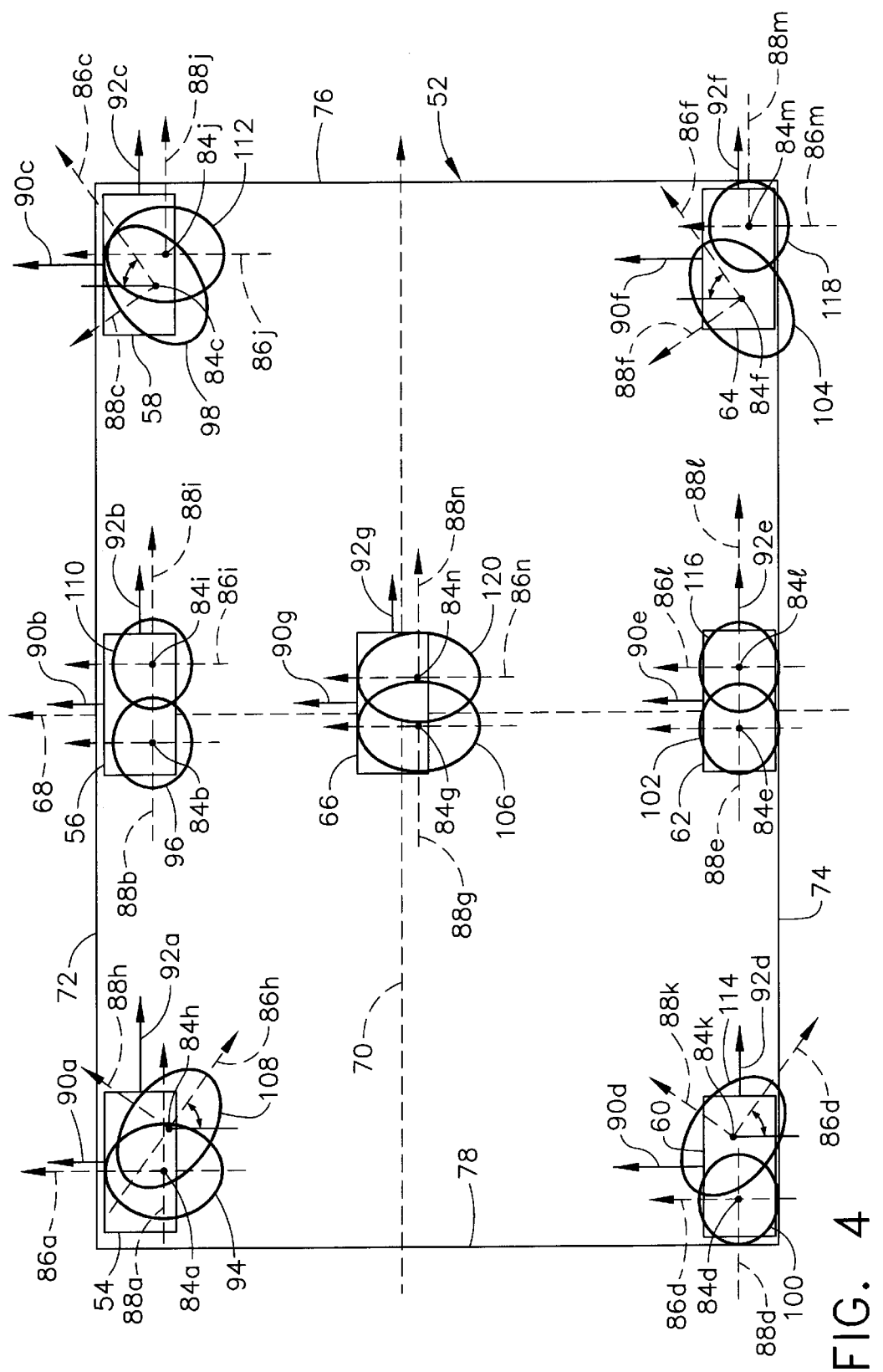
FIG. 4 is an exemplary screen display presented in accordance with the principles of the present invention.

FIG. 4 depicts a diagrammatic view of an exemplary screen display 52, where a plurality of various touchable items 54, 56, 58, 60, 62, 64, and 66 are shown thereon. It will be seen that a vertical axis 68 and a horizontal axis 70 are provided through the respective midpoints of touchscreen 26 and that a top edge 72, a bottom edge 74, a right edge 76 and a left edge 78 of touchscreen 26 is identified to assist in providing a reference. Accordingly, touchable items 54, 56, and 58 are located adjacent to top edge 72 of touchscreen 26, touchable items 60, 62, and 64 are located adjacent to bottom edge 74 of touchscreen 26, and touchable item 66 is located approximately at an intersection of vertical and horizontal axes 68 and 70.

As stated hereinabove, the optimum position for a target area associated with each touchable item displayed on touchscreen 26 is dependent upon the display location of such touchable item thereon and the angle of approach taken by the user to touch (and thereby activate) the touchable item. In this way, the overlap area between the target area and an anticipated touch by the user for a particular touchable item is maximized and the likelihood of an error is minimized. It will be understood that the angle of approach taken by a right-handed user will be from right edge 76 of touchscreen 26 while that for a left-handed user will be from left edge 78 of touchscreen 26.

Figures 5, 6:
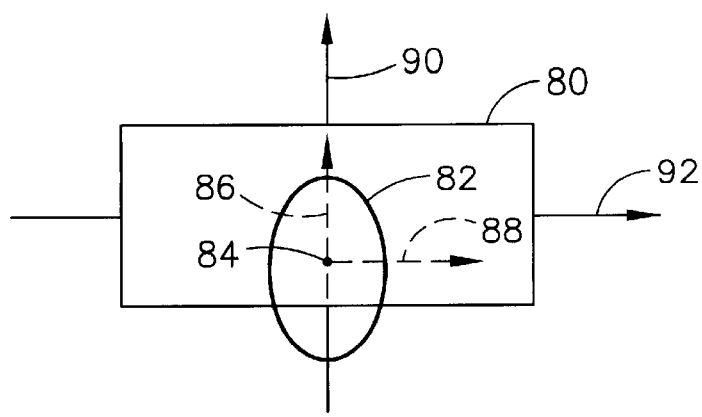
FIG. 5 is an enlarged, partial diagrammatic view of an exemplary touchable element and associated target area as seen in FIG. 4.
FIG. 6 is a screen display provided during set-up or log-on of the portable intelligent communications device depicted in FIGS. 1–3.

It will be seen from FIG. 5, where an enlarged touchable item 80 and target area 82 therefor are provided, that certain parameters must be defined for such target area 82 in order to properly position it. This involves a centerpoint 84 for target area 82, as well as a major axis 86 and a minor axis 88 running therethrough. It will also be seen that touchable item 80 likewise has a vertical axis 90 and a horizontal axis 92 running therethrough. Although target area 82 is shown as an ellipse since this usually best approximates an actual touch by a user of device 10, it will be understood that any shape may be utilized therefor. Target area 82 may be a rectangle, for example, in order to reduce the amount of programming and memory required for processing circuit 30.

For a left-handed user of portable intelligent communications device 10 (i.e., where the angle of approach is from left edge 78 of touchscreen 26), it will be seen in FIG. 4 that the respective target areas 94, 96, 98, 100, 102, 104 and 106 for touchable items 54, 56, 58, 60, 62, 64 and 66 will vary depending on the display location of such touchable items. As seen for touchable items 54 and 60 located adjacent to left edge 78 of touchscreen 26, for example, centerpoints 84a and 84d of target areas 94 and 100 lie substantially on a parallel to vertical axes 90a and 90d, respectively. Accordingly, major axes 86a and 86d of target areas 94 and 100 are substantially parallel to vertical axes 90a and 90d. With respect to touchable items 60 and 62, it will be noted that minor axes 88d and 88e of target areas 100 and 102 are located substantially on horizontal axes 92d and 92e.

Since target area 100 for touchable item 60 best aligns with vertical and horizontal axes 90d and 92d, respectively, for a left-handed user, it will be appreciated that the centerpoints of target areas for other touchable items on screen display 52 will preferably be shifted proportionately to the left as the touchable item is located closer to right edge 76 of touchscreen 26 and shifted proportionately downward as the touchable item is located closer to top edge 72 of touchscreen 26. It has also been found that major axis 86 and minor axis 88 of the target area will be rotated proportionately clockwise as the touchable item is located to the right of touchscreen vertical axis 68. This provides a degree of slant to the target area which better accommodates the amount of reach required by the left-handed angle of approach.

Accordingly, it will be seen in FIG. 4 that centerpoints 84b, 84e and 84g of target areas 96, 102 and 106, respectively, are shifted slightly to the left of vertical axes 90b, 90e and 90g for touchable items 56, 62 and 66, with centerpoints 84c and 84f of target areas 98 and 104 being shifted even more to the left of vertical axes 90c and 90f for touchable items 58 and 64. Centerpoint 84g of target area 106 is shifted slightly below horizontal axis 92g for touchable item 66, with centerpoints 84a, 84b and 84c of target areas 94, 96 and 98, respectively, being shifted even more below horizontal axes 92a, 92b and 92c for touchable items 54, 56 and 58. Further, major axes 86c and 86f and minor axes 88c and 88f of target areas 98 and 104 are rotated clockwise with respect to vertical axes 90c and 90f and horizontal axes 92c and 92f, respectively, for touchable items 58 and 64 (preferably in a range of 20–60°).

For a right-handed user of portable intelligent communications device 10 (i.e., where the angle of approach is from right edge 76 of touchscreen 26), it will be seen in FIG. 4 that the respective target areas 108, 110, 112, 114, 116, 118 and 120 for touchable items 54, 56, 58, 60, 62, 64 and 66 will likewise vary depending on the display location of such touchable items. As seen for touchable items 58 and 64 located adjacent to right edge 76 of touchscreen 26, for example, centerpoints 84j and 84m of target areas 112 and 118 lie substantially on vertical axes 90c and 90f, respectively. Accordingly, major axes 86j and 86m of target areas 112 and 118 are substantially parallel to vertical axes 90c and 90f. With respect to touchable items 62 and 64, it will be noted that minor axes 88l and 88m of target areas 116 and 118 are located substantially on horizontal axes 92e and 92f.

Since target area 118 for touchable item 64 best aligns with vertical and horizontal axes 90f and 92f, respectively, for a right-handed user, it will be appreciated that the centerpoints of target areas for other touchable items on screen display 52 will preferably be shifted proportionately to the right as the touchable item is located closer to left edge 78 of touchscreen 26 and shifted proportionately downward as the touchable item is located closer to top edge 72 of touchscreen 26. It has also been found that major axis 86 and minor axis 88 of the target area will be rotated proportionately counter-clockwise as the touchable item is located to the left of touchscreen vertical axis 68 (see, e.g., target areas 108 and 114). This provides a degree of slant to the target area which better accommodates the amount of reach required by the right-handed angle of approach.

More specifically, it will be seen that centerpoints 84i, 84l and 84n of target areas 110, 116 and 120, respectively, are shifted slightly to the right of vertical axes 90b, 90e and 90g for touchable items 56, 62 and 66, with centerpoints 84h and 84k of target areas 108 and 114 being shifted even more to the right of vertical axes 90a and 90d for touchable items 54 and 60. Centerpoint 84n of target area 106 is shifted slightly below horizontal axis 92g for touchable item 66, with centerpoints 84h, 84i and 84j of target areas 108, 110 and 112, respectively, being shifted even more below horizontal axes 92a, 92b and 92c for touchable items 54, 56 and 58. Further, major axes 86h and 86k and minor axes 88h and 88k of target areas 108 and 114 are rotated counter-clockwise with respect to vertical axes 90a and 90d and horizontal axes 92a and 92d, respectively, for touchable items 54 and 60 (preferably in a range of approximately −20° to −60°).

In order that portable intelligent communications device 10 will know how to configure the target area for each touchable item displayed on touchscreen 26, it preferably will query the user as to which hand will be used for selecting a touchable item via a set up screen display 122 as depicted in FIG. 6. While this will generally be sufficient for a device which is used by a single user, an alternative is for portable intelligent communications device 10 to query the user each time it is activated by a log-on screen display like that shown in FIG. 6.

Figure 7A:
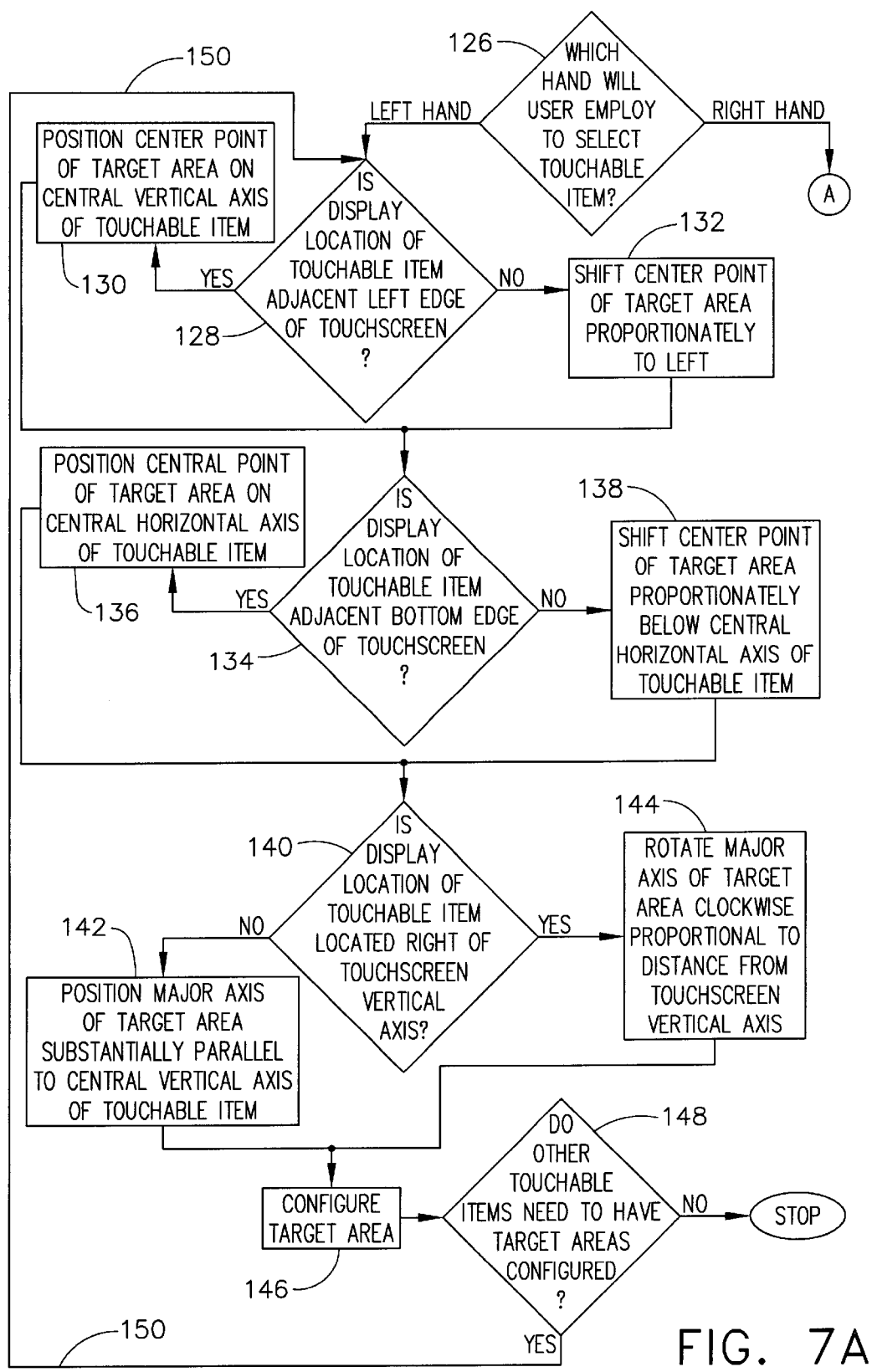
FIG. 7 is a flow chart of the steps by which the method of the present invention is accomplished.
Figure 7B:
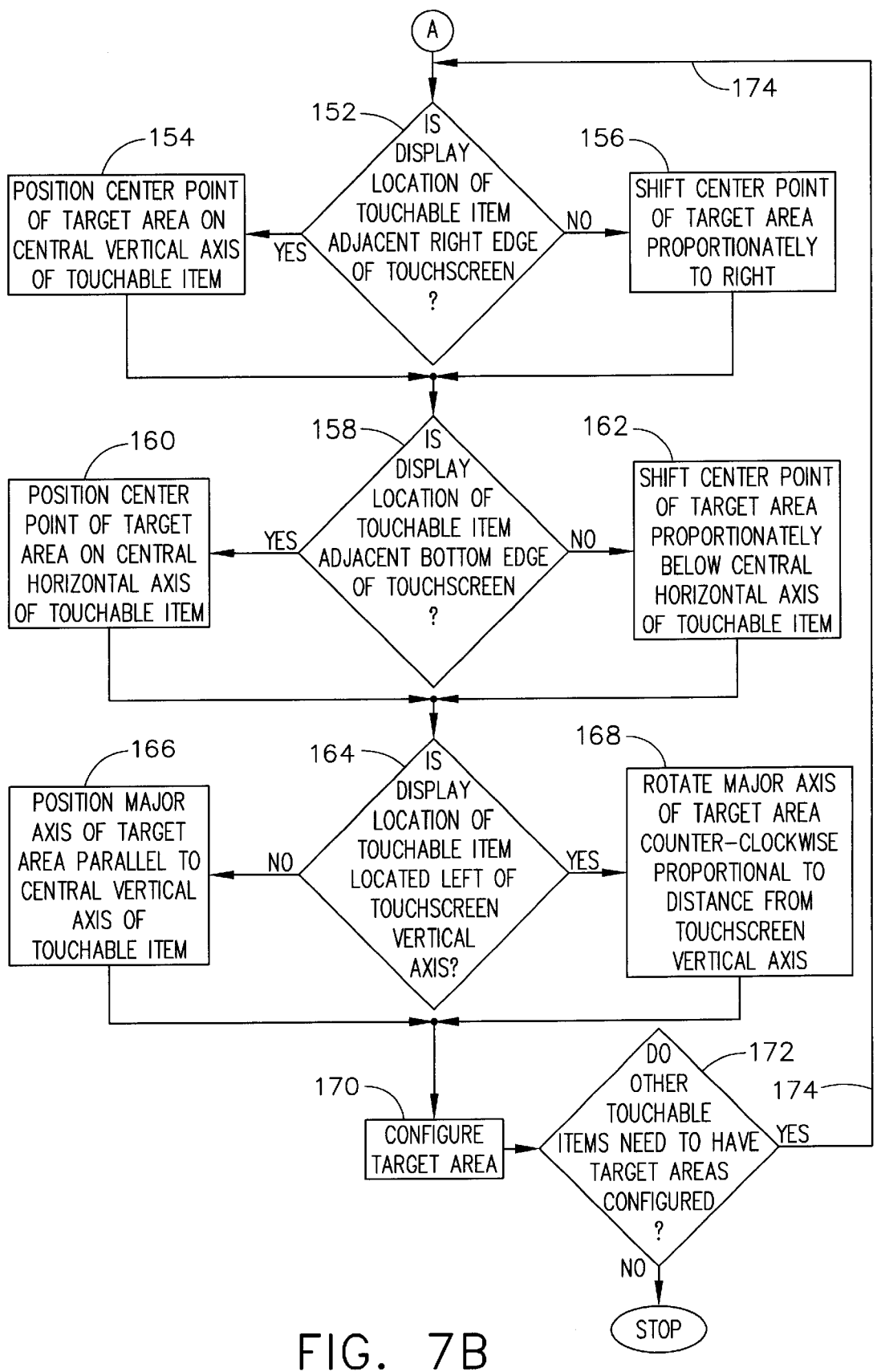

As seen in the flow chart of FIG. 7, the process of configuring a target area for a touchable item on touchscreen 26 initially involves determining which hand (right or left) the user will employ, also known herein as the angle of approach, to select such touchable items (decision box 126). Once this is determined, target area 82 for touchable item 80 is positioned according to the particular display location for touchable item 80 on touchscreen 26 (see FIG. 5 for general reference numerals).

Assuming the answer to decision box 126 is "left hand," one approach is to determine whether the display location for touchable item 80 is adjacent left edge 78 of touchscreen 26 (decision box 128). If the answer is affirmative, processing circuit 30 positions center point 84 of target area 82 on central vertical axis 90 of touchable item 80 (box 130). Otherwise, center point 84 is shifted proportionately to the left based on the distance touchable item 80 is from left edge 78 of touchscreen 26 (box 132).

Next, processing circuit 30 determines whether the display location for touchable item 80 is adjacent bottom edge 74 of touchscreen 26 (decision box 134). If this is answered in the positive, center point 84 of target area 82 is then positioned on central horizontal axis 92 of touchable item 80 (box 136). When answered in the negative, center point 84 of target area 82 is shifted proportionately below central horizontal axis 92 of touchable item 80 based on the distance from bottom edge 74 of touchscreen 26 (box 138).

The third inquiry regarding display location of touchable item 80 involves whether such display location is located right of vertical axis 68 of touchscreen 26 (decision box 140). If this is not the case, major axis 86 (and minor axis 88) of target area 82 is positioned substantially parallel to central vertical axis 90 (and central horizontal axis 92) of touchable item 80 (box 142). When touchable item 80 is located to the right of vertical axis 68 of touchscreen 26, major axis 86 (and minor axis 88) of target area 82 is rotated proportionately clockwise with respect to touchable item central vertical axis 90 (and central horizontal axis 92) based on the distance from touchscreen vertical axis 68 (box 144).

Once the inquiries of decision boxes 128, 134 and 140 have been answered, target area 82 for touchable item 80 can be configured in accordance with a desired shape (box 146). This process clearly occurs for configuring the target area of each touchable item displayed on touchscreen 26 for each display screen of a given software application, as seen by decision box 148 and feedback loop 150.

The process occurs similarly when the answer to decision box 128 is the user's right hand. As seen in FIG. 8, the first inquiry involves whether the display location of touchable item 80 is adjacent right edge 76 of touchscreen 26 (decision box 152). When this is answered affirmatively, center point 84 of target area 82 is positioned on central vertical axis 90 of touchable item 80 (box 154). Otherwise, center point 84 is shifted proportionately to the right of central vertical axis 90 based on the distance away from right edge 76 of touchscreen 26 (box 156).

Secondly, processing circuit 30 determines whether the display location for touchable item 80 is adjacent bottom edge 74 of touchscreen 26 (decision box 158). If this is the case, center point 84 of target area 82 is positioned on central horizontal axis 92 of touchable item 80 (box 160). If not, center point 84 is shifted proportionately below central horizontal axis 92 as touchable item 80 is located further from bottom edge 74 (box 162).

The third inquiry involves whether the display location of touchable item 80 is located left of vertical axis 68 of touchscreen 26 (decision box 164). When answered negatively, major axis 86 (and minor axis 88) of target area 82 is positioned substantially parallel to central vertical axis 90 (and central horizontal axis 92) of touchable item 80 (box 166). When answered positively, major axis 86 (and minor axis 88) is then rotated counter-clockwise with respect to central vertical axis 90 (and central horizontal axis 92) in an amount proportional to the distance from vertical axis 68 (box 168).

Once the inquiries of decision boxes 152, 158 and 164 have been answered, target area 82 for touchable item 80 can then be configured for a right hand angle of approach in accordance with a desired shape (box 170). This process continues for each touchable item, as evidenced by decision box 172 and feedback loop 174, so that the target area of each touchable item displayed on touchscreen 26 can be configured.

Having shown and described the preferred embodiment of the present invention, further adaptations of the apparatus and method for configuring the target areas within the touchable items on a touchscreen can be accomplished by appropriate modifications by one of ordinary skill in the art without departing from the scope of the invention.

What is claimed is:

1. A method of configuring a target area within a touchable item provided on a touchscreen, comprising the following steps:
    (a) determining an angle of approach employed by a user of said touchscreen to select said touchable item;
    (b) determining a display location for said touchable item within said touchscreen; and
    (c) defining said target area for said touchable item in accordance with the determinations of steps (a) and (b), whereby an overlap area between said target area and an anticipated actual touch by the user is maximized.

2. The method of claim 1, wherein said angle of approach is a function of which hand is employed by the user to select said touchable item.

3. The method of claim 2, step (a) further comprising querying the user at set up as to which hand will be employed for selecting touchable items on said touchscreen.

4. The method of claim 2, step (a) further comprising querying the user at log on as to which hand will be employed for selecting touchable items on said touchscreen.

5. The method of claim 1, step (c) further comprising:
    (a) modeling a shape for said target area;
    (b) determining a center point for said target area within said touchable item; and
    (c) determining an orientation for said target area within said touchable item.

6. The method of claim 5, wherein said angle of approach is from left of said touchscreen.

7. The method of claim 6, wherein said target area center point lies substantially on a central vertical axis of said touchable item when said touchable item is located along a left edge of said touchscreen.

8. The method of claim 6, wherein said target area center point is shifted proportionately to the left of a central vertical axis of said touchable item as said touchable item is located further from a left edge of said touchscreen.

9. The method of claim 6, wherein said target area center point lies substantially on a central horizontal axis of said touchable item when said touchable item is located along a bottom edge of said touchscreen.

10. The method of claim 6, wherein said target area center point is shifted proportionately below a central horizontal axis of said touchable item as said touchable item is located further from a bottom edge of said touchscreen.

11. The method of claim 7, wherein said target area is oriented so that a major axis therethrough is substantially parallel to said central vertical axis of said touchable item.

12. The method of claim 8, wherein said target area is oriented so that a minor axis therethrough is rotated proportionately clockwise in relation to said central vertical axis of said touchable item as said touchable item is located right of a vertical midpoint for said touchscreen.

13. The method of claim 5, wherein said angle of approach is from right of said touchscreen.

14. The method of claim 13, wherein said target area center point lies substantially on a central vertical axis of said touchable item when said touchable item is located along a right edge of said touchscreen.

15. The method of claim 13, wherein said target area center point is shifted proportionately to the right of central vertical axis of said touchable item as said touchable item is located further from a right edge of said touchscreen.

16. The method of claim 13, wherein said target area center point lies substantially on a central horizontal axis of said touchable item when said touchable item is located along a bottom edge of said touchscreen.

17. The method of claim 13, wherein said target area center point is shifted proportionately below a central horizontal axis of said touchable item as said touchable item is located further from a bottom edge of said touchscreen.

18. The method of claim 14, wherein said target area is oriented so that a major axis therethrough is substantially parallel to said central vertical axis of said touchable item.

19. The method of claim 15, wherein said target area is oriented so that a major axis therethrough is rotated proportionately counter-clockwise in relation to said central vertical axis of said touchable item as said touchable item is located left of a vertical midpoint for said touchscreen.

20. The method of claim 5, wherein said target area approximates an elliptical shape.

21. The method of claim 5, wherein said target area approximates a rectangular shape.

22. In a computer system having a memory circuit, a processing circuit, and a touchscreen, a method of configuring a target area for activating each touchable item displayed on said touchscreen, comprising the following steps:
(a) determining which hand is to be employed by a user of said computer system to select said touchable items;
(b) determining a display location for each touchable item on said touchscreen;
(c) modeling a shape for said target area of each touchable item;
(d) positioning a center point for said target area of each touchable item according to the determinations of steps (a) and (b); and
(e) orienting said target area of each touchable item according to the determinations of steps (a) and (b);
whereby an overlap area between the target area for each touchable item and an anticipated actual touch is maximized.

23. The method of claim 22, said center point of a target area being positioned along a major axis and a minor axis through said target area substantially parallel to a central vertical axis and a central horizontal axis, respectively, for a touchable item located along a central vertical axis and a central horizontal axis of said touchscreen.

24. The method of claim 23, wherein said major axis of said target area is located to the right of said touchable item central vertical axis when the user employs his right hand to activate said touchable item.

25. The method of claim 23, wherein said major axis of said target area is located to the left of said touchable item central vertical axis when the user employs his left hand to activate said touchable item.

26. The method of claim 22, said center point of a target area being positioned along a major axis and a minor axis through said target area, wherein said major axis or said target area shifts toward alignment with a central vertical axis of a touchable item as the touchable item is located toward a top right corner of said touchscreen when the user employs his right hand to activate said touchable item.

27. The method of claim 22, said center point of a target area being positioned along a major axis and a minor axis through said target area, wherein said major axis of said target area shifts toward alignment with a central vertical axis of a touchable item as the touchable item is located toward a top left corner of said touchscreen when the user employs his left hand to activate said touchable item.

28. The method of claim 23, wherein said minor axis of said target area is located below said central horizontal axis of said touchable item.

29. The method of claim 22, said center point of a target area being positioned along a major axis and a minor axis through said target area, wherein said minor axis of said target area shifts toward alignment with a central horizontal axis of a touchable item as the touchable item is located toward a bottom edge of said touchscreen.

30. A portable intelligent communications device, comprising:
(a) circuitry for performing telephony operations;
(b) a memory circuit for storing a plurality of touchable items representative of certain functions of said portable intelligent communications device;
(c) a touchscreen for displaying said touchable items, each said touchable item including a target area associated therewith; and
(d) a processing circuit for configuring said target area of each said touchable item according to the location of said touchable item on said touchscreen and which hand is employed by a user of said portable intelligent communications device, whereby an overlap area between said target area and an anticipated actual touch by the user is maximized.

31. The portable intelligent communications device of claim 30, wherein said processing circuit queries the user at set up of said portable intelligent communications device which hand is to be employed by the user to select said touchable items.

32. The portable intelligent communications device of claim 30, wherein said processing circuit queries the user at log on of said portable intelligent communications device which hand is to be employed by the user to select said touchable items.

33. The portable intelligent communications device of claim 30, wherein said processing circuit configures the target area for each touchable item by modeling a shape for the target area, determining a center point for the target area within each touchable item, and determining an orientation for the target area within each touchable item.

34. The portable intelligent communications device of claim 33, wherein the shape of the target area approximates an elliptical shape.

35. The portable intelligent communications device of claim 33, wherein said processing circuit positions a center point of a target area along a major axis and a minor axis through said target area substantially parallel to a central vertical axis and a central horizontal axis, respectively, for a touchable item located along a central vertical axis and a central horizontal axis of said touchscreen.

36. The portable intelligent communications device of claim 35, wherein said processing circuit locates said major axis of said target area to the right of said touchable item central vertical axis when the user employs his right hand to activate said touchable item.

37. The portable intelligent communications device of claim 35, wherein said processing circuit locates said major axis of said target area to the left of said touchable item central vertical axis when the use employs his left hand to activate said touchable item.

38. The portable intelligent communications device of claim 33, wherein said processing circuit positions a center point of a target area along a major axis and a minor axis through said target area, said processing circuit shifting said major axis of said target area toward alignment with the central vertical axis of a touchable item as the touchable item is located toward a top right corner of said touchscreen when the user employs his right hand to activate said touchable item.

39. The portable intelligent communications device of claim 33, wherein said processing circuit positions a center point of a target area long a major axis and a minor axis through said target area, said processing circuit shifting said major axis of said target area toward alignment with the central vertical axis of a touchable item as the touchable item is located toward a top left corner of said touchscreen when the user employs his left hand to activate said touchable item.

40. The portable intelligent communications device of claim 35, wherein said processing circuit locates said minor axis of said target area below said central horizontal axis of said touchable item.

41. The portable intelligent communications device of claim 33, wherein said processing circuit positions a center point of a target area along a major axis and a minor axis through said target area, said processing circuit shifting said minor axis or said target area toward alignment with a central horizontal axis of a touchable item as the touchable item is located toward a bottom edge of said touchscreen.

* * * * *

UNITED STATES PATENT AND TRADEMARK OFFICE
CERTIFICATE OF CORRECTION

PATENT NO. : 6,256,021 B1
DATED : July 3, 2001
INVENTOR(S) : Mona Singh

Page 1 of 1

It is certified that error appears in the above-identified patent and that said Letters Patent is hereby corrected as shown below:

Column 11, claim 37,
Line 13, delete "use" and insert -- user --.

Column 12, claim 39,
Line 3, delete "long" and insert -- along --.

Signed and Sealed this

Twelfth Day of March, 2002

Attest:

Attesting Officer

JAMES E. ROGAN
Director of the United States Patent and Trademark Office